A. Y. SEELY.
AUTOMATIC WEIGHING MACHINE.
APPLICATION FILED SEPT. 20, 1920.

1,432,128.

Patented Oct. 17, 1922.
5 SHEETS—SHEET 1.

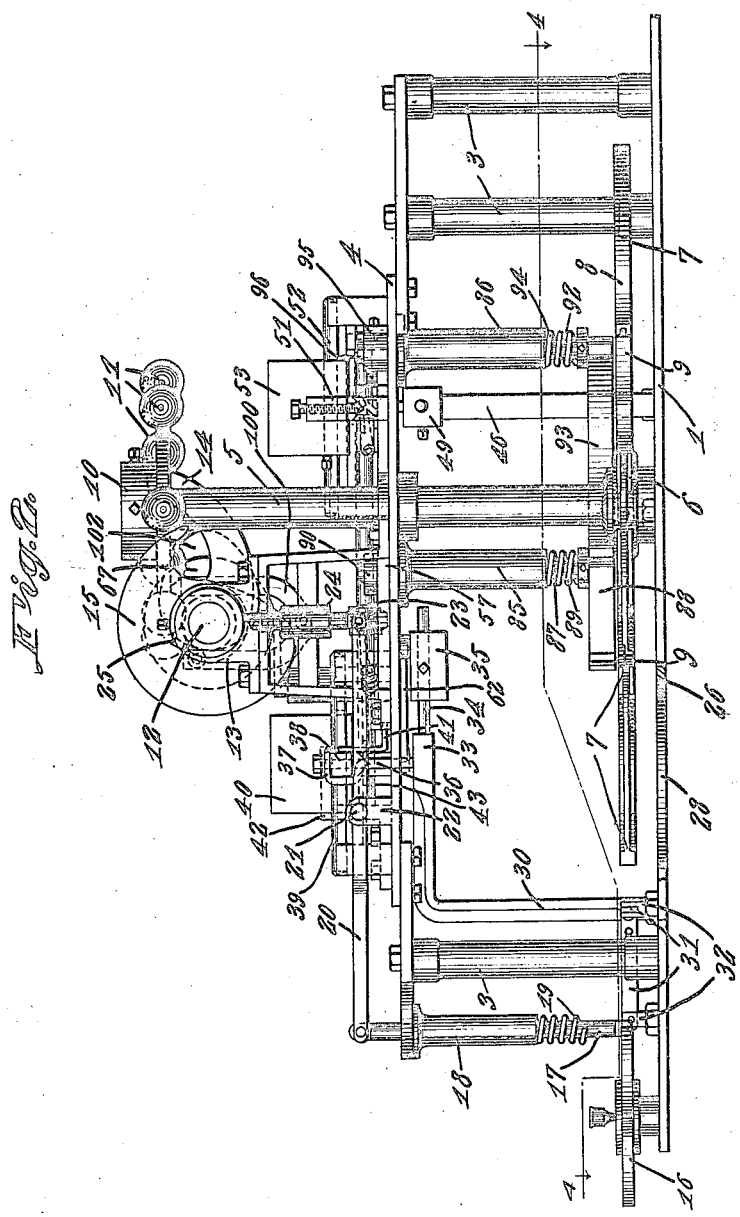

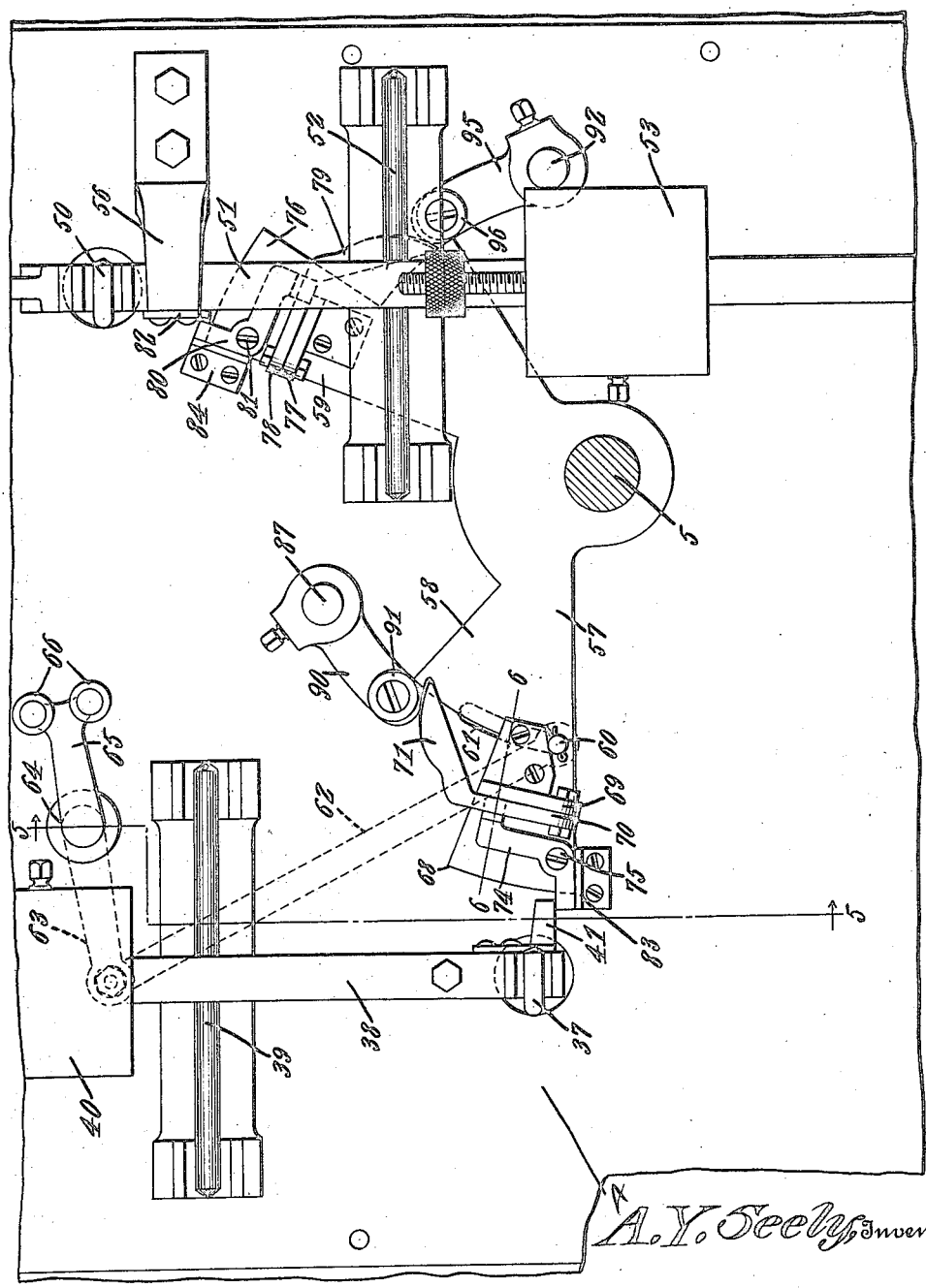

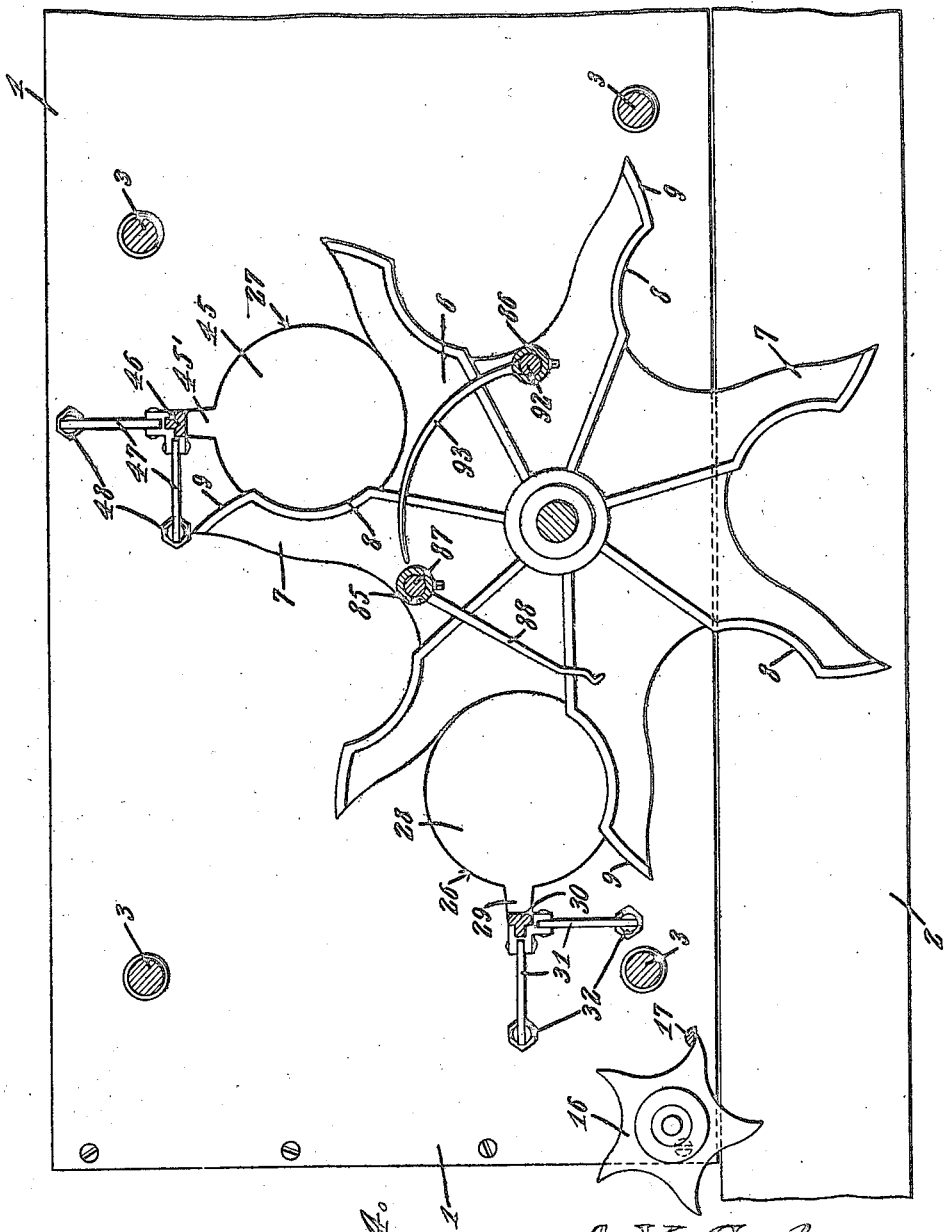

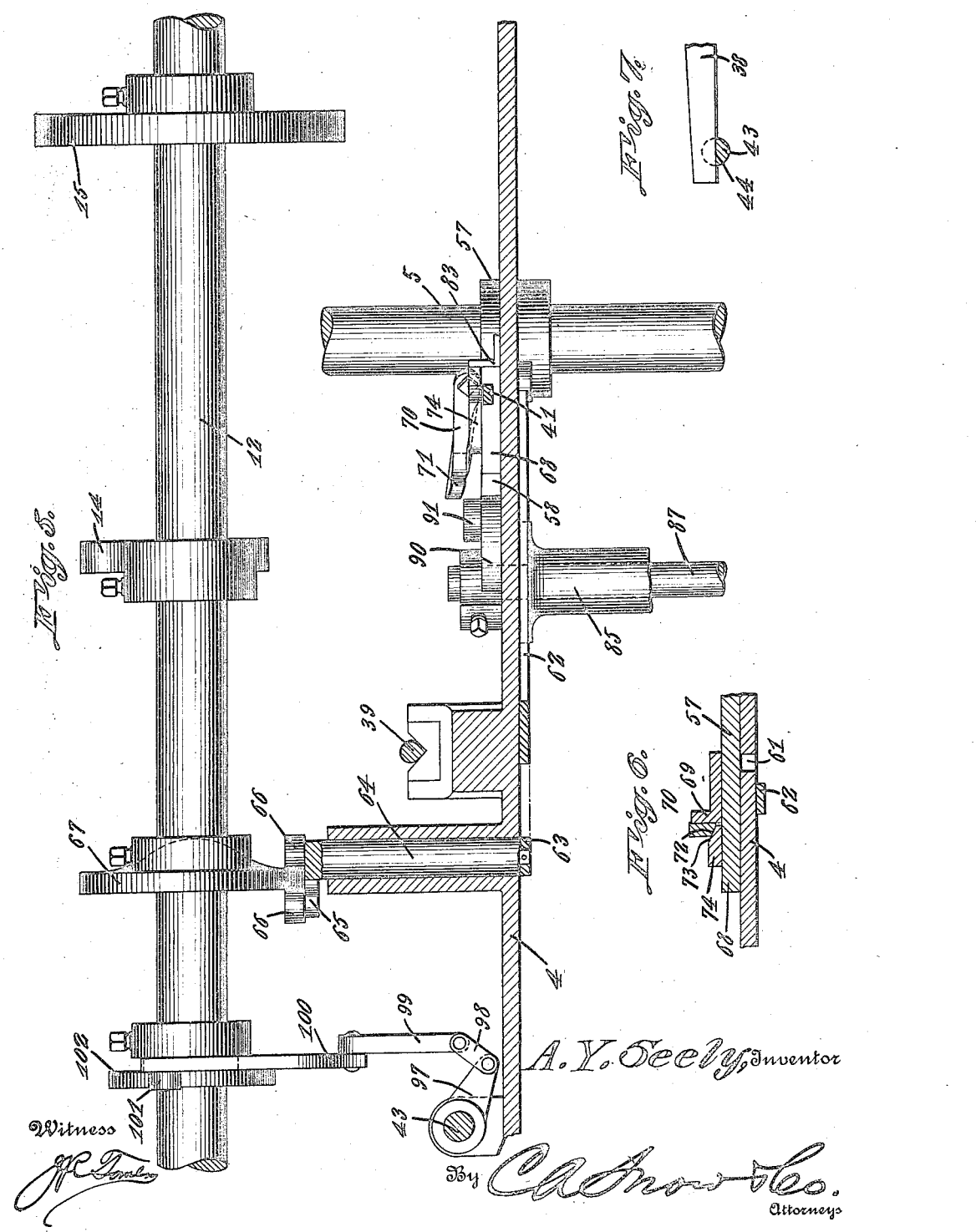

Patented Oct. 17, 1922.

1,432,128

UNITED STATES PATENT OFFICE.

ARTHUR Y. SEELY, OF BLAINE, WASHINGTON.

AUTOMATIC WEIGHING MACHINE.

Application filed September 20, 1920. Serial No. 411,355.

*To all whom it may concern:*

Be it known that I, ARTHUR Y. SEELY, a citizen of the United States, residing at Blaine, in the county of Whatcom and State of Washington, have invented a new and useful Automatic Weighing Machine, of which the following is a specification.

This invention relates to a machine for weighing cans automatically, means being provided whereby if a can is under a predetermined weight or over a predetermined weight it will be discarded by mechanism provided for that purpose, it only being possible for cans containing a predetermined amount of material to pass completely through the machine.

A further object is to provide mechanism whereby the cans are fed in properly timed relation to the weighing mechanism.

Another object is to provide weighing mechanism which will be locked against movement until a can has been deposited thereon, thus preventing any actuation of the mechanism that might be due to the movement of the can onto or off of the scales platform provided therefor.

A still further object is to provide means whereby the cans, after being placed upon the scales platform, are disengaged from their conveying means so that there will be no frictional contact between the cans and any object or objects that might tend to interfere with the up or down movement of the cans while being weighed.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 2 is a side elevation thereof.

Figure 3 is a horizontal section showing the scale beams and cooperating mechanism in plan.

Figure 4 is a section on line 4—4, Figure 2.

Figure 5 is a section on line 5—5, Figure 3.

Figure 6 is a section on line 6—6, Figure 3.

Figure 7 is a section on line 7—7, Figure 1.

Figure 1:
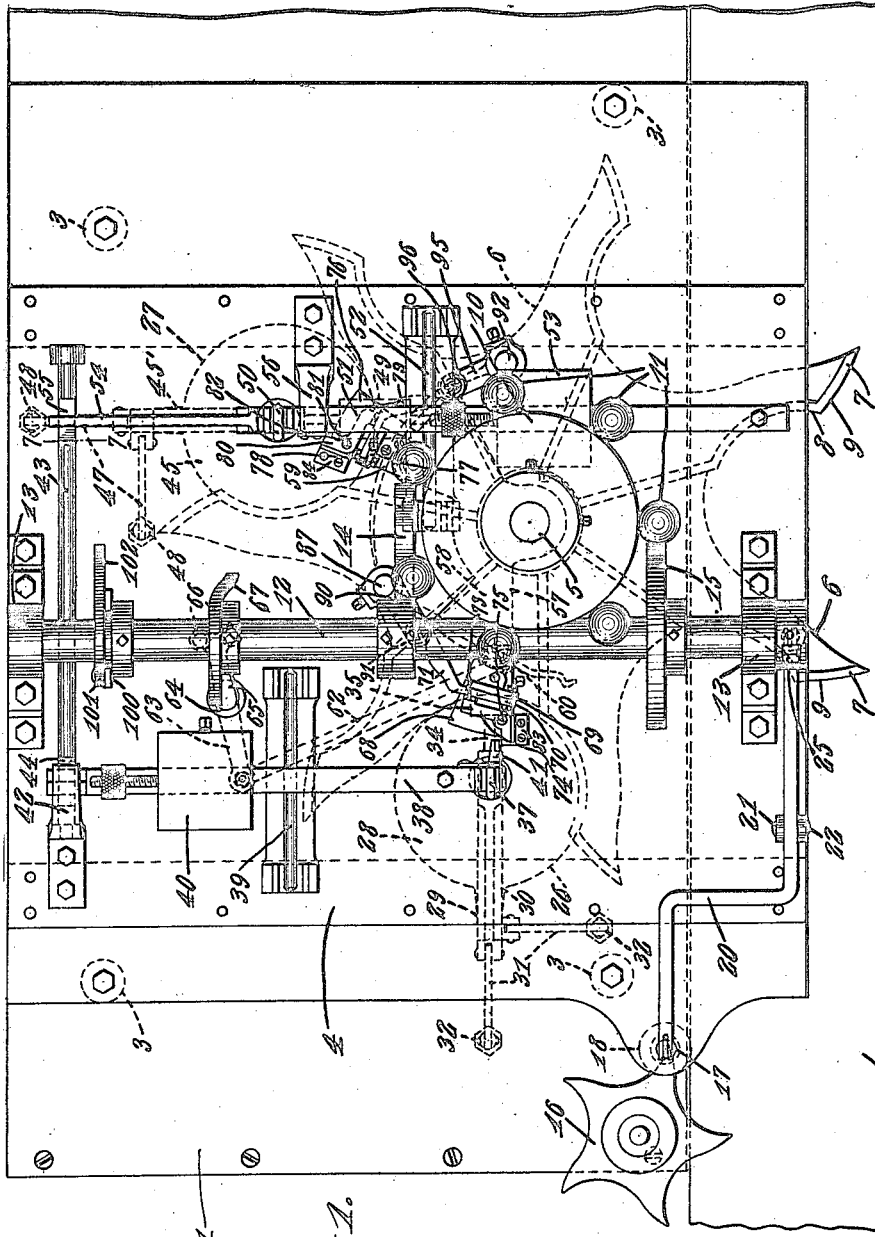
Figure 1 is a plan view of the machine.

Referring to the figures by characters of reference 1 designates a table along one side of which travels a conveyor belt 2, the upper surfaces of the belt and table being flush so that cans can be readily slid from the belt onto the table and from the table back to the belt in the manner hereinafter pointed out. The table is provided with standards 3 which support a top plate 4.

Journaled on the table 1 and in the top plate 4 is a vertical shaft 5 to the lower portion of which is secured a turret or rotary carrier 6 from which radiate fingers 7 separated by substantially semicircular recesses 8, the outer end of the advancing face of each finger being curved outwardly and backwardly oppositely to the direction of rotation, as shown at 9 thus to form cam faces or deflectors as will be hereinafter pointed out.

Secured to the upper portion of the shaft 5 is a wheel 10 having ball teeth 11 upon the periphery thereof.

A drive shaft 12 is journaled in bearings 13 mounted on the top plate 4 and is adapted to be driven by any suitable mechanism not shown. Secured to and revoluble with this shaft are spaced cams 14 and 15 adapted to engage the ball teeth 11. These cams are so proportioned and mounted that, during each rotation of the shaft 12 the cam 14 will move against one of the teeth 11 and thrust it so as to swing one of the fingers 7 of the turret from position across the belt 2 to position above the table 1 and practically parallel with the belt. Immediately subsequent to this movement the other cam 15 will move against one of the teeth 11 and give a slight retro-active motion to the turret 6 so that the fingers 7 will move backwardly out of contact with the cans or other articles in the recesses between the fingers.

Mounted for rotation on the table 1 is a star wheel 16, the fingers of which are adapted successively to extend partly across the belt 2, thus to prevent the cans or the like from moving forwardly with the belt until the wheel 16 is permitted to rotate. This wheel is held normally against rotation by a bolt 17 slidably mounted within a tubular guide or hanger 18 depending from the plate 4, there being a spring 19 for holding the bolt normally pressed downwardly into the path of one of the fingers of the star wheel 16 so as to prevent rotation of the wheel. The upper end of the bolt 17 is pivotally connected to one end of a lever 20 fulcrumed as at 21 on a bracket 22 mounted on the plate 4. This lever has a pin 23 pivotally connected to the other end thereof and slidable within a guide 24 on the outer side of one of the bearings 13, the upper end of the pin being beveled, as shown particularly in Figure 2, so as to be engaged and depressed once during each rotation of the shaft 12 by a trip 25 connected to the shaft 12. Thus once during each rotation of the shaft 12 one of the cans held back upon the belt 2 by the star wheel 16 will be released and will be carried forwardly by the belt into the recess in front of that finger 7 projecting across the belt, the cans reaching this recess immediately subsequent to the movement of the turret by the cams as heretofore explained.

Formed in the table 1 are openings 26 and 27 in which are mounted the platforms of light weight scales and heavy scales respectively. The platform 28 of the light weight scales has a radial arm 29 extending from the lower end of a hanger 30, said hanger being properly centered by links 31 extending therefrom at right angles to each other and pivotally connected to the hanger and also to brackets 32 mounted on the table 1. The hanger extends upwardly close to the plate 4 and thence horizontally, as indicated at 33, there being a stem 34 projecting from the upper end of the hanger and carrying a counterbalance 35. The hanger 30 and the scale platforms are supported by a hanger 36 fixed relative to the horizontally extending portion 33 and having a hook 37 at its upper end which embraces and bears downwardly upon the short arm of a scale beam 38 which is fulcrumed as at 39 and the other arm of which carries an adjustable weight 40. Secured to one side of the beam 38 and close to the hook 37 is a stop finger 41. The far end of the beam 38 projects under a stop bracket 42 and over a rock shaft 43 having a flattened face 44 allowing a limited up and down movement of the end of beam 38 between said face 44 and the bracket 42.

The platform 45 of the heavy weight scales is movably mounted within the opening 27 of the table 1 and has a radial arm 45′ provided at the lower end of a hanger 46 which is held properly centered by links 47 pivotally connected to the hanger and to brackets 48 mounted on the table. The upper portion of this hanger 46 is extended horizontally in the same manner as is the hanger 30 and is provided with a counterbalance 49. This hanger 46 is suspended by a hook 50 from one arm of a scale beam 51 fulcrumed as at 52 and the other arm of which has a weight 53 adjustably mounted thereon. That end of the scale beam 51 on which the hook 50 is mounted is provided with an extension or finger 54 which projects over the rock shaft 43, there being a flat face 55 on said shaft adapted, when uppermost, to allow the platform supporting end of the beam 51 to move downwardly a limited distance. A bracket 56 overhangs the beam 51 close to the hook 50 for limiting the upward movement of said beam under the action of the weight 53.

A swing plate 57 is mounted for movement on the plate 4 and is provided with diverging segments 58 and 59. One of these segments (58) is engaged by a pin 60 extending through a slot 61 in the plate 4 and from one end of a link 62 the other end of which is connected to a crank arm 63. This crank arm is provided upon a shaft 64 journaled in the plate 4 and provided at its upper end with an arm 65 having spaced antifriction rollers 66. Extending between these rollers is a cam 67 carried by the shaft 12 and adapted, during the rotation of said shaft, to impart an oscillating movement to the plate 57. Secured to the wing or segment 58 of the plate 57 is an extension 68 having a bracket 69 to which is pivotally connected a bar 70 having an obliquely disposed free end portion constituting a cam 71. The lower edge of this bar 70 is beveled, as indicated at 72 in Figure 6 and is adapted to be engaged and supported by the beveled face 73 of a lifting lever 74 in the form of a bell crank and which is fulcrumed, as at 75, upon the extension 68. One arm of this bell crank projects beyond the extension 68 and is adapted either to move over or to abut against the projection 41, depending on the position of the beam 38.

The wing or segment 59 also has an extension 76 provided with a bracket 77 to which a bar 78 is pivotally connected, this bar having an obliquely extended free end portion 79 forming a cam. The lower edge of the bar 78 is beveled in the same manner as is that of the bar 70 and is adapted to be engaged by the beveled edge of a bell crank lever 80 pivotally mounted, as at 81, upon the extension 76. This bell crank lever is adapted to move against or under a plate or projection 82 extending from the beam 61. Mounted on the plate 4 and in the path of the bell crank lever 74 is a bracket 83 constituting an abutment designed, when the bell crank lever comes thereagainst, to force the beveled edge portion of the lever 74 under the bar 70 so as to raise said bar about its pivot. A similar bracket or abutment 84 is mounted on the plate 4 adjacent and in the path of the lever 80 for the purpose of forcing said lever under the bar 78 to raise it.

Depending from the plate 4 are tubular hangers 85 and 86. In the hanger 85 is journaled a rod 87 provided, at its lower end, with a sweep or finger 88 extending close to the inner portion of the opening 26. A spring 89 is connected to the rod 87 and to the sleeve or hanger 85 and serves to hold the sweep 88 normally in its innermost position, as shown in Figure 4. The upper end of the rod 87 is provided with a crank arm 90 having a roller 91 adapted to be engaged and shifted laterally by the cam extension 71 when the bar 70 is in its lowermost position. Ordinarily, however, this bar is held elevated by the end of the lever 74 so that the cam 71 will not contact with and actuate the roller 91.

A rod 92 is journaled in the tubular hanger 86 and is provided at its lower end with a sweep 93 extending close to the innermost portion of the opening 27 in the table 1. A spring 94 is connected to this rod 92 and to the hanger 86 and serves to hold the sweep normally in its innermost position as shown in Figure 4. To the upper end portion of the rod 92 is secured a crank arm 95 carrying a roller 96 adapted to be engaged by the cam projection 79 of bar 78 when said bar is in its lowermost position. Ordinarily, however, said bar is held raised by the end of the lever 80 as hereinbefore explained so that the roller 96 will not be engaged and shifted by the cam 79.

The rock shaft 43 has a crank arm 97 connected by a link 98 to a stem 99 projecting from a fork 100 which straddles the shaft 12 and has a roller 101 adapted to be raised and lowered by a cam 102 secured to the shaft 12.

In operation it is understood of course that the power is transmitted through the mechanism from the shaft 12 which is driven by any suitable means. The cans after passing through the machine are designed to weigh a predetermined amount or a slight variation thereabove or therebelow. The weights 40 and 53 are adjusted to the minimum and maximum amounts respectively. After the cans have been filled they are conveyed by the belt 2 until the first can comes against the wheel 16 which is held normally against rotation by the bolt 17. During the first rotation of the shaft 12 this bolt will be lifted momentarily so as to release the wheel 16 after which the bolt will spring back to its normal position and prevent further rotation of the wheel after the next finger thereof comes into contact with the bolt. This momentary rotation of the wheel will be sufficient, however, to allow one can to pass the wheel and to travel forwardly into the recess in front of the finger 7 which extends across the belt 2. Immediately after the arrival of a filled can in this recess the cam 14 will come against one of the ball teeth and cause the wheel 10 and the shaft 5 to rotate a sufficient distance to sweep the can off of the belt 2 and onto the platform 28 of the light weight scales. Immediately subsequent to the arrival of the can upon this platform the cam 15 will come against one of the teeth 11 and cause a retrograde movement of the turret 6 so that the finger which propelled the can onto the platform scales will be moved out of contact with the can. Consequently the can will contact solely with the platform on which it is mounted. Up to this time the rock shaft 43 has been held against rotation with the flat faces 44 and 55 turned downwardly away from the beams 38 and 51 with the result that the rounded surface of the shaft 43 contact with the beam 38 and holds it pressed against the stop 42 while the finger 54 is at the same time pressed upwardly to hold the beam 51 against the stop bracket 56. Just after the arrival of the can upon the platform 28 the cam 102 will operate the fork 100 so as to rotate shaft 43 and bring the flat faces 44 and 55 uppermost, thereby leaving room for slight vertical movement of the beams 38 and 51. If the filled can on the platform 28 is of a weight equal to or greater than that to which the weight 40 has been adjusted the beam 38 will not move while thus released and, during the next rotation of the turret 6, the can will be moved off of the platform 28 and onto the table 1 and subsequently to the platform 44 of the heavy weight scales. If, however, the filled can deposited on the platform 28 is underweight, the weight 40 will overbalance it and cause the can to be elevated slightly with the beam 38. This will move the projection 41 upwardly into the path of the projecting end of lever 74. The cam 67 is so proportioned that immediately after the can has been placed on the platform 28 the crank arm 63 will be actuated to pull, through links 52, upon the swing plate 57 so as to oscillate it. Thus if the weight of the can on the platform 28 is not sufficient to hold the platform down, and the projection 41 raises into the path of the lever 74, it will be apparent that during the oscillation of the swing plate 57 lever 74 will be shifted on its pivot so as to withdraw from under the bar 70. Accordingly said bar will swing downwardly so as to cause the cam projection to move against and shift the roller 91. As a result the shaft or rod 87 will be rotated and the sweep 88 will press against the can on the platform 28 and shove it radially away from the turret. As soon as the swing plate returns to its normal position the lever 74 will come against the abutment 83 and the parts on the swing plate will be returned to their normal or set positions. Likewise the springs connected to the rod 87 will return said rod to its normal position. The discarded can will be deposited by the sweep on the table 1 and in the path of the cam face of the finger 7 adjacent the can. Thus during the next movement of the turret this cam face 9 will come against the discarded can and push it farther onto the table 1 and out of the path of the turret.

As before stated, if the can is of proper weight, or is overweight, it will pass over the platform 28 and onto the table 1, remaining in engagement with the turret 6. During the next movement of the turret this can will be carried thereby onto the platform 44 and if the can is of correct weight it will subsequently be moved off of said platform and onto the table 1 and thence back onto the belt 2 which will convey the can away from the machine. Until the can is deposited on the platform 44 the finger 54 is held against movement by the rock shaft 43, the flat face 55 being normally in its lowermost position. After the can has been deposited and the turret has been moved backwardly a slight distance to free the can, the rock shaft 43 is actuated to bring the flat face 55 uppermost and thus allow a slight movement of the scale beam 51. If the can is overweight it will overbalance the weight 53 and cause the plate of projection 82 to move downwardly into the path of the lever 80. Thus when the swing plate 57 is next actuated this lever 80 will be withdrawn from under the bar 78 which will drop, bringing the cam extension 79 in position to engage and shift the roller 96. Accordingly the sweep 93 will be swung outwardly and move the can radially from the turret so that during the next movement of the turret the cam face 9 adjacent the cam will engage said cam and shift it out of the path of the turret.

What is claimed is:

1. The combination with a table and a conveyor belt adjacent thereto, of scales having a platform seated in the table, an intermittently rotatable star wheel extending over the belt for holding articles against movement with the belt, a turret extending over the belt for engaging articles one at a time, means for operating the turret to move an engaged article from the belt and onto the table to the scale platform, and means controlled by the movement of the turret for intermittently releasing the star wheel.

2. The combination with a table, a conveyor belt adjacent thereto, and scales having a platform seated in the table, of a turret extending over the table and belt, means for intermittently rotating this turret to convey articles from the belt to the scales platform, and an intermittently rotatable star wheel operating in timed relation with the turret for directing articles one at a time along the belt to the turret.

3. The combination with a table and a belt conveyor adjacent thereto, of scales having a platform in the table, a turret, a continuously rotatable shaft, a cam thereon, means cooperating with the cam for intermittently rotating the turret to convey articles from the belt to the scales platform, a rotatable wheel for preventing movement of articles with the belt tripping means rotatable with the shaft, and means actuated by the tripping means and operating in timed relation with the turret for releasing said wheel intermittently to supply articles in properly timed relation to the turret.

4. The combination with scales platform, of a turret, means for supplying articles to the turret, a shaft, a gear rotatable with the turret, a cam on the shaft and cooperating with the gear for rotating the turret to convey the articles successively to the scales platform, and a cam on the shaft and cooperating with the gear for imparting a retrograde movement to the turret after each article has been deposited on the scales platform.

5. The combination with scales including a platform, a weighted scale beam supporting the platform, and a stop for the beam, of a turret, means for feeding articles to the turret in properly timed succession, means for rotating the turret to convey articles intermittently to the platform, a rock shaft for holding the scale beam normally against the stop, means operating in properly timed relation with the turret for rotating the shaft relative to the stop to release the scale beam, a sweep adjacent the platform, a crank arm movable therewith, an intermittently operating swing plate, a normally inactive cam movable with the swing plate, means operated by the movement of the scale beam when released for releasing the cam upon the swing plate, said cam when released being movable against the crank arm to actuate the sweep and discard a can from the scales platform.

6. The combination with a swing plate, a drop bar pivotally connected thereto, and a cam extension upon the swing plate, of means movable with the swing plate for holding the drop bar normally elevated, a normally stationary arm adjacent the swing plate, a scale beam, means operated by the movement of the scale beam for engagement with the bar supporting means to release said bar during the movement of the swing plate, and means for actuating the swing plate to thrust the cam extension on the released drop bar against the arm in the path thereof, and a sweep operated by said arm.

7. The combination with a swing plate, a drop bar pivotally mounted thereon, a cam extension upon the bar, and a lever normally extending under and supporting the bar and its extension, of a scale beam, a projection thereon, a scale platform, means for directing an article onto the platform to actuate the beam and shift the projection into the path of the lever on the swing plate, means for actuating the swing plate relative to said projection to shift the lever and release the drop bar from the support thereof, an arm in the path of the cam extension upon the release bar, and a sweep movable with the arm and over the scale platform.

8. The combination with scales including a platform, a weighted scale beam supporting the platform, a stop for the beam, of a turret, means for rotating the turret to convey articles intermittently to the platform, a rock shaft for holding the scale beam normally against the stop, and means operating in properly timed relation with the turret for rotating the rock shaft relative to the stop to release the scale beam.

9. The combination with scales including a platform, a weighted scale beam supporting the platform, and a turret rotatable to convey articles intermittently to the platform, of a sweep adjacent the platform, a crank arm movable therewith, an intermittently operating swing plate, a normally inactive cam movable with the swing plate, means operated by the movement of the scale beam for releasing the cam upon the swing plate, said cam when released being movable against the crank arm to actuate the sweep and discard a can from the scales platform.

In testimony that I claim the foregoing as my own, I have hereto affixed by signature in the presence of two witnesses.

ARTHUR Y. SEELY.

Witnesses:
LESTER WHITMORE,
GEORGE S. SHAW.